Patented Feb. 20, 1940

2,190,907

UNITED STATES PATENT OFFICE 2,190,907

REACTION PRODUCTS OF DI-CHLORO-DI-OXANE AND THE HALO-ORGANIC ACIDS

Harold R. Slagh, Midland, Mich., assignor to The Dow Chemical Company, Midland, Mich., a corporation of Michigan No Drawing. Application August 28, 1937, Serial No. 161,469

9 Claims. (Cl. 260—338)

This invention concerns ester products of the reaction between 1,4-dioxanediol-2,3 and the halogen-substituted carboxylic acids.

I have discovered that the halogen-substituted carboxylic acids react with 2,3-dichloro-dioxane-1,4 to form valuable ester products. Di-esters of 1,4-dioxanediol-2,3 and mono-esters of 2-chlorodioxaneol-3 can be prepared by heating 2,3-dichloro-dioxane-1,4 with halogen-substituted carboxylic acids and thereafter separating the desired ester products from the reacted mixture. In carrying out the reaction, the acid and dichloro-dioxane are mixed together and warmed to a temperature at which hydrogen chloride is evolved from the mixture. Following completion of the reaction, the crude reaction mixture is treated to recover the desired ester products.

While the halogen-substituted carboxylic acid and dichloro-dioxane can be reacted together in varying proportions, I generally employ from about 0.5 to about 2.25 molecular equivalents of acid for each mole of dichloro-dioxane present in the reaction mixture. A mixture of the di-esters of 1,4-dioxanediol-2,3 and the mono-esters of 2-chloro-dioxaneol-3 is generally formed, the di-ester being formed in increasing proportion as the ratio of acid to dichloro-dioxane in the reaction mixture increases.

The preferred reaction temperature varies with the particular acid employed but is generally between about 100° C. and the decomposition temperature of the reaction mixture, although somewhat lower temperatures may sometimes be employed. If desired, the reactants may be dissolved in an inert solvent such as benzene, chloro-benzene, toluene, xylene, etc., and the reaction carried out by heating the mixture at its refluxing temperature. The time required for carrying out the reaction is dependent upon the reaction temperature employed and whether a mono- or di-ester compound is desired as the major product of reaction.

The methods by which the ester products are isolated from the crude reaction mixture vary with the particular compounds concerned. For example, in isolating the ester derivatives of low boiling and stable acids, the crude reaction product may be fractionally distilled under reduced pressure. When high boiling or unstable acids are employed in the reaction, the crude mixture resulting therefrom may be partially distilled under reduced pressure to recover low boiling products of reaction and unreacted acid and dichloro-dioxane, and subsequently fractionally crystallized, clarified with activated carbon, or selectively extracted with solvents adapted to effect separation between the desired ester derivatives and residual reactants present therein. When the ester products formed are insoluble, a preliminary separation can be accomplished by filtering the reaction mixture.

The products obtained by reacting different halogen-substituted carboxylic acids with 2,3-dichloro-dioxane-1,4 vary in characteristic from stable crystalline compounds of definite melting point to unstable, viscous liquids which decompose on distillation and have the characteristic of rapid polymerization upon exposure to air and light. These compounds have been found useful for a number of purposes, e. g. as plasticizers, insecticidal agents, intermediates, etc.

The following examples set forth the characteristics and method of preparation for certain representative members of my new class of compounds but are not to be construed as limiting the invention.

Example 1

A mixture of 94.5 grams (1 mole) of mono-chloro-acetic acid, 79 grams (0.5 mole) of 2,3-dichloro-dioxane-1,4, and 100 milliliters of toluene was heated under reflux at a temperature of 124° C. for 10.5 hours. The reaction mixture was then cooled and fractionally distilled under reduced pressure, whereby there was obtained 77 grams of the di-(mono-chloro-acetate) of 1,4-dioxanediol-2,3 as a yellow tinged liquid boiling at 161°–167° C. and having the specific gravity 1.380 at 25°/25° C. This product was somewhat light-sensitive, and had a sharp, penetrating odor. The chlorine content thereof, as determined by analysis, was 24.45 per cent by weight.

Example 2

In a similar manner 79 grams (0.5 mole) of 2,3-dichloro-dioxane-1,4 and 100 milliliters of toluene were refluxed with 129 grams (1 mole) of dichloro-acetic acid at temperatures increasing from 98° C. to 124° C. over a period of 4 hours. The reacted product was thereafter cooled and distilled under vacuum whereby there was obtained 72 grams of the di-(dichloro-acetate) of 1,4-dioxanediol-2,3 as a yellow tinged, viscous liquid boiling at 165°–174° C. at 0.15 inch pressure, and having a specific gravity of 1.556 at 25°/25° C.

Example 3

A mixture of 104 grams (0.66 mole) of 4-chlorobenzoic acid, 52 grams (0.33 mole) of 2,3-dichlorodioxane-1,4, and 125 milliliters of xylene was refluxed at 145°–150° C. for 5 hours. The reaction mixture was then cooled and filtered, and the residue washed with xylene and dried. 105 grams of the di-(4-chloro-benzoate) of 1,4-dioxanediol-2,3 was thereby obtained as fine, white crystals melting at 174° C. and having a very faint ester odor.

Example 4

138 grams (0.5 mole) of symmetrical dibromo-succinic acid, 39.5 grams (0.25 mole) of 2,3-dichloro-dioxane-1,4 and 100 milliliters of xylene were mixed together and refluxed at 134° C. for 2.5 hours. Filtration of the reaction mixture resulted in the recovery of 64 grams of starting acid as a residue. Fractional distillation of the filtrate yielded an additional 43 grams of unreacted acid and 52 grams of a di-(symmetrical-dibromo-succinate) of 1,4-dioxanediol-2,3 product as a dark, syrupy liquid which decomposed on attempted distillation.

Other acids which may be reacted with 2,3-dichloro-dioxane-1,4 in a manner analogous with that described in the foregoing examples include the following: alpha-bromo-butyric acid, mono-bromo-acetic acid, 5-chloro-pyromucic acid, polychloro-stearic acid, 2,4,6-tri-chloro-phenoxy-acetic acid, alpha-bromo-cinnamic acid, 2-chloro-benzoic acid, 4-chloro-alpha-naphthoic acid, alpha-chloro-crotonic acid, beta-bromo-crotonic acid, 2,4-dichloro-phenyl-acrylic acid, etc. If desired, mixtures of the above and similar halogen-substituted carboxylic acids may be reacted with 2,3-dichloro-dioxane-1,4 to obtain di-ester products in which the esterifying groups are not identical. Similarly, mono-esters of 2-chloro-dioxaneol-3 can be reacted with the halogen-substituted carboxylic acids to give mixed di-esters of dioxaneol-2,3. The products obtained in any of the above described procedures may be employed in their crude form without isolating therefrom any particular ester components thereof.

Other modes of applying the principles of my invention may be employed instead of those explained, change being made as regards the materials employed, provided the products described in the following claims be thereby obtained.

I therefore particularly point out and distinctly claim as my invention:

1. The di-ester of 1,4-dioxanediol-2,3 and a halogen-substituted carboxylic acid.
2. The di-ester of 1,4-dioxanediol-2,3 and a halogen-substituted mono-carboxylic acid.
3. The di-ester of 1,4-dioxanediol-2,3 and a halogen-substituted aromatic carboxylic acid.
4. The di-ester of 1,4-dioxanediol-2,3 and a halogen-substituted aliphatic carboxylic acid.
5. The di-ester of 1,4-dioxanediol-2,3 and a chlorine-substituted aliphatic carboxylic acid.
6. The di-ester of 1,4-dioxanediol-2,3 and a chlorine-substituted fatty acid.
7. Di-(monochloro-acetate) of 1,4-dioxanediol-2,3.
8. Di-(dichloro-acetate) of 1,4-dioxanediol-2,3.
9. Di-(4-chloro-benzoate) of 1,4-dioxanediol-2,3.

HAROLD R. SLAGH.